3,392,173
NOVEL ACYL DERIVATIVES OF DESACETYL-VINCALEUKOBLASTINE AND PROCESSES FOR THEIR PREPARATION

William W. Hargrove, Indianapolis, Ind., assignor to Eli Lilly and Company, Indianapolis, Ind., a corporation of Indiana
No Drawing. Filed Mar. 9, 1964, Ser. No. 350,519
10 Claims. (Cl. 260—286)

ABSTRACT OF THE DISCLOSURE

A process for the preparation of desacetylvincaleukoblastine and novel acyl derivatives thereof is provided.

---

This invention relates to novel esters of certain desacylated polynuclear indoles and to a novel procedure useful in the production of such esters.

The compounds provided by this invention can be represented by the following formula:

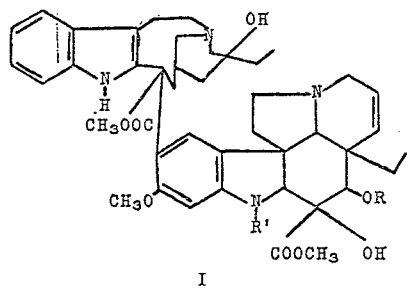

I wherein R is a member of the group consisting of aryl-substituted $C_1$–$C_5$ alkyl-CO—, aryl-CO—, halo-substituted $C_1$–$C_5$ alkyl-CO—, and cyano-substituted $C_1$–$C_5$ alkyl-CO—; and, R' is a member of the group consisting of $C_1$–$C_5$ alkyl, H—CO—, and $C_1$–$C_5$ alkyl-CO—, In a second aspect of this invention, there is provided a process for the preparation of compounds represented by Formula I above as well as for certain other compounds which are available from other sources.

This process can be graphically formulated as follows:

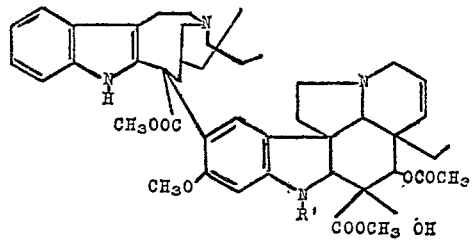

II

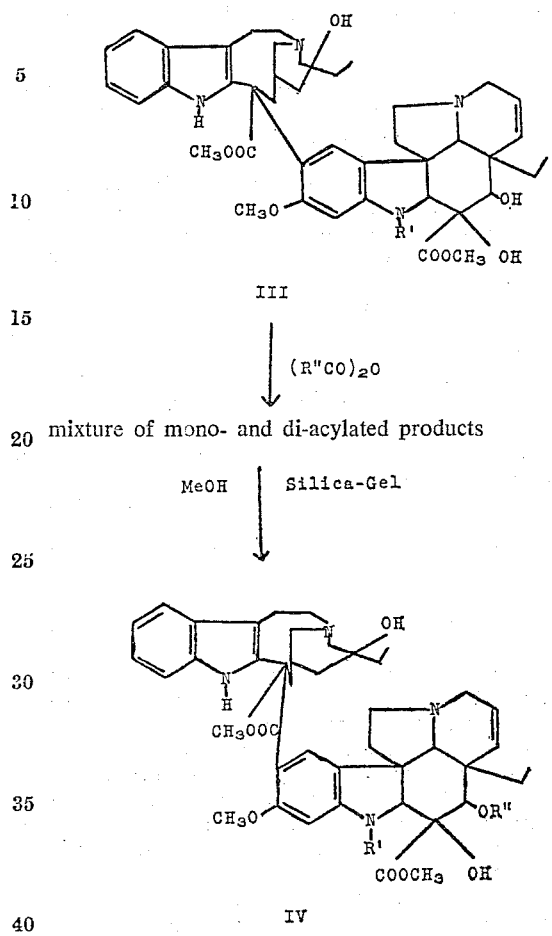

wherein R' has the same meaning as hereinabove; and, R" is a member of the group consisting of N—CO—, $C_1$–$C_5$ alkyl-CO—, aryl-substituted $C_1$–$C_5$ alkyl-CO—, aryl-CO—, halo-substituted $C_1$–$C_5$ alkyl-CO—, and cyano-substituted $C_1$–$C_5$ alkyl-CO—.

In Formula II above, when R' is methyl, the compound thus represented is vincaleukoblastine, to be referred to hereinafter as VLB. When R' in Formula II above is formyl, the compound thus represented is leurocristine, to be referred to hereinafter as LCR. Starting materials having the structure represented by Formula II in which R' is other than methyl or formyl are prepared by alkylating or acylating des-N-methyl VLB with the appropriate alkylating or acylating agent, as set forth in the copending application of Marvin Gorman, Ser. No. 233,917, filed Oct. 29, 1962, now abandoned; continuation-in-part filed Mar. 24, 1964, Ser. No. 354,420, now abandoned; continuation-in-part filed Dec. 14, 1966, Ser. No. 601,858 now U.S. Patent 3,354,163, issued Nov. 21, 1967.

According to the above equation, VLB or LCR or a compound in which R' is other than methyl or formyl (II), is converted to the corresponding desacetyl compound (III), conveniently by a hydrolysis step plus purification steps if necessary. The hydrolysis step is followed by an acylation procedure, preferably using an acid anhydride, which yields a mixture of mono- and di-acylated products and finally by a selective hydrolysis procedure whereby said mono- and di-ester mixture is converted substantially to a mono-ester (IV).

In the above formula when R' or R" represents $C_1$–$C_5$ alkyl-CO—, it can be illustratively acetyl, propionyl, butyryl, isobutyryl, valeryl, isovaleryl, caproyl, isocaproyl, 2-methylvaleryl, 3-methylvaleryl, 2,2-dimethylbutyryl, and the like.

In the above formula, R' can also represent a $C_1$–$C_5$ alkyl group such as for example methyl, ethyl, propyl, 1-methylethyl, n-butyl, isobutyl, sec.-butyl, t-butyl, 1-pentyl, 2-methyl-1-butyl, isopentyl, 1,1-dimethylpropyl, 2-pentyl, 3-pentyl, and the like.

When R and R" represent an aryl-CO—group, the term "aryl" includes both monocyclic and bicyclic aryl radicals such as for example, phenyl, thienyl, furyl, pyridyl, pyrimidyl, pyridazinyl, pyrazinyl, naphthyl, naphpyridyl, and the like. In general, the term "aryl" includes any monocyclic or bicyclic radical which fulfills the usual criteria for aromaticity and also includes any of these aryl radicals when substituted with any of the usual aromatic substituents such as lower alkyl, halogen, lower alkoxy, methylenedioxy, nitro, halo-substituted lower alkyl (such as trifluoromethyl), acyl, and the like. In general, these substituted aromatic radicals are the full equivalent of the unsubstituted radical for the purposes of this invention.

As indicated above, R and R" can also represent any of the above $C_1$–$C_5$ alkyl-CO— groupings when they are substituted by an aryl, a halogen, or a cyano group. Among the aryl substituents which can be present in the alkanoyl radical are included all of the above aryl groups, substituted as well as unsubstituted.

Among the halogens which can be substituted into a $C_1$–$C_5$ alkyl-CO— grouping which R and R' represent are included all members of the seventh main group of the periodic table including particularly fluorine, chlorine, and bromine.

Groupings which further illustrate the scope of the terms R and R" in the above formula include the following: α - naphthylacetyl, β - naphthylacetyl, 2 - (p - chlorophenyl)propionyl, fluoroacetyl, 3-cyanobutyryl, 2-chloro-2-methyl-1-butyryl, iodoacetyl, 5-(2-pyridyl)valeryl, 5-(2-pyrimidyl)caproyl, β - trifluoromethylphenylacetyl, α-bromopropionyl, m-nitrophenylacetyl, and the like.

Considering the above novel process in greater detail, the first step of the process involves the hydrolysis of a monoacetate compound (II). The hydrolysis can be carried out using either acidic or basic conditions. For example, I have successfully employed as hydrolytic agents methanolic hydrogen chloride, 85 percent hydrazine hydrate in ethylene glycol or ethanol, excess potassium carbonate in methanol, or one equivalent of potassium hydroxide in anhydrous methanol. VLB is smoothly hydrolyzed to desacetyl VLB by these reagents without extensively hydrolyzing other ester groups in the molecule. LCR, however, and other compounds in which R' is acyl, lose the R' grouping during the hydrolysis to yield desformyl desacetyl LCR (or desmethyl desacetyl VLB). The original R' grouping is then readily replaced by a controlled acylation procedure to yield a compound represented by III.

The second step of the process, the acylation step, which preferably uses an acid anhydride as the acylating agent, not only acylates the hydroxyl group from which the acetyl group had previously been removed by the hydrolysis step described above, but also acylates to some degree one of the other free hydroxyls present in the molecule, usually the hydroxyl on the carbon atom α to the carbon atom originally carrying the acetoxy radical. The separation of the di-ester and mono-ester produced by the acylation step is difficult by most standard techniques, but I have found that treatment of the mixture with a suspension of silica-gel in moist methanol smoothly converts any di-ester present to the desired monoester (IV).

The compounds of this invention have shown utility in their ability to prolong the life of mice inoculated with the P–1534 strain of mouse leukemia. The following table gives the results of tests in which the compounds of this invention demonstrated this desirable utility. In the table, Column 1 gives the R substituent from Formula I, Column 2 the R' substituent, Column 3 the dose level, and Column 4 the percent prolongation of life in the treated mice over that of a control group of mice injected only with the particular pharmaceutical vehicle used for the injections of the active drug.

TABLE 1

| R Substituent | R' Substituent | Dose Level in mg./kg. | Percent Prolongation |
| --- | --- | --- | --- |
| $C_6H_5CH_2CO$— | $CH_3$ | 2 | 25 |
| $C_6H_5CO$— | $CH_3$ | 0.75 | 32 |
| $ClCH_2CO$— | $CH_3$ | 0.35 | 127 |
| $Cl_2CHCO$— | $CH_3$ | 0.3 | 37 |
| $CNCH_2CO$— | $CH_3$ | 0.33 | 31 |

The process of this invention is useful not only for producing the novel oncolytic agents of the invention, but also for preparing VLB and LCR tagged with radio carbon in the acetyl side chain.

In addition, certain of the compounds provided by this invention, in particular desacetyl VLB chloroacetate and desacetyl LCR chloroacetate, can be reacted with ammonia or amines to yield desacetyl VLB glycinate, desacetyl VLB N,N-dimethyl glycinate, desacetyl LCR glycinate and the like. The latter compounds have also been shown to possess oncolytic activity when tested in standard laboratory animals.

This invention is further illustrated by the following specific examples:

Example 1.—Desacetyl VLB

Eight grams of VLB free base were dissolved in methanol saturated with gaseous hydrogen chloride at 0° C. The resulting reaction mixture was allowed to remain at room temperature for about 72 hours. The volatile components were removed by evaporation in vacuo and the resulting residue dissolved in water. The acidic aqueous solution was made basic by the addition of an excess of 14 N ammonium hydroxide. The alkaline layer was extracted with methylene dichloride; the methylene dichloride layer was separated; and the methylene dichloride removed therefrom by evaporation in vacuo. The resulting residue, comprising desacetyl VLB, was dissolved in methanol. Crystalline desacetyl VLB free base was obtained by adding water to the point of turbidity to the warm methanolic solution and then cooling the solution; yield=5.26 g.

Example 2.—Alternate preparation of desacetyl VLB

Fifty grams of VLB sulfate were treated with an excess of aqueous ammonia, thus forming VLB free base. The free base was extracted into methylene dichloride; the methylene dichloride layer was separated; and the methylene dichloride was removed therefrom by evaporation in vacuo. The residue was dried by adding benzene thereto and distilling the water-benzene azeotrope from the resulting mixture. The resulting residue was added to 3 liters of methanol saturated with gaseous hydrogen chloride at 0° C. This mixture was stirred until solution was effected and was then allowed to remain at room temperature overnight. Thin layer chromatography of an aliquot of the reaction mixture showed nearly complete conversion of VLB to yield desacetyl VLB. The solvents were removed from the reaction mixture by evaporation in vacuo. The residue was dissolved in water and the resulting acidic aqueous solution made basic with 14 N ammonium hydroxide. The organic bases separated and were extracted with methylene dichloride. The methylene dichloride extract was washed once with an equal volume of saturated sodium chloride solution and was then separated. The methylene dichloride was removed by evaporation in vacuo, and the residue dried by adding benzene and ethanol thereto and distilling the benzene-water-ethanol azeotrope from the resulting mixture. The dried residue was then dissolved in a minimal amount of hot ethanol and crystallization was induced by seeding. Twenty grams of crystalline desacetyl VLB were obtained by this procedure.

Example 3.—Alternate preparation of desacetyl VLB

A reaction mixture was prepared containing 20 ml. of 85 percent hydrazine hydrate, 5 g. of VLB sulfate, 50 ml. of ethylene glycol, and about 200 ml. of 95 percent ethanol. The reaction mixture was warmed to effect solution of the VLB sulfate. It was then kept at ambient room temperature for about 16 hours. The ethanol was removed from the reaction mixture by evaporation in vacuo. The reaction mixture was then extracted six times with about 250 ml. portions of methylene dichloride. The methylene dichloride extracts were combined and the solvents removed by evaporation in vacuo. Thin layer chromatography of an aliquot of the resulting residue showed that it consisted chiefly of desacetyl VLB with only a small quantity of VLB present. Recrystallization of the residue from an ethanol-water mixture yielded three grams of desacetyl VLB.

The above reaction was repeated except that the ethylene glycol was omitted from the reaction mixture. An 80 percent yield of desacetyl VLB was obtained.

Example 4.—Alternate preparation of desacetyl VLB

Three grams of VLB sulfate were dissolved in water. An excess of 14 N ammonium hydroxide was added thereto, thus forming VLB free base which, being insoluble in the alkaline solution, separated and was extracted into methylene dichloride. The methylene dichloride layer was separated and the solvents removed therefrom by evaporation in vacuo. The residue, comprising VLB free base, was dissolved in about 100 ml. of methanol and the resulting solution was saturated with gaseous hydrogen chloride. The acidic solution was stirred for about 72 hours at ambient room temperature, and was then heated at refluxing temperatures for about 3 hours. The reaction mixture was cooled. An excess of 14 N ammonium hydroxide was added and the resulting free bases extracted into methylene dichloride solution. The methylene dichloride extract was separated and the solvents removed therefrom by evaporation in vacuo. Thin layer chromatography of the resulting residue indicated a mixture of desacetyl VLB and VLB.

Example 5.—Alternate preparation of desacetyl VLB

One gram of VLB was dissolved in 300 ml. of methanol; 150 mg. of potassium carbonate were added, and the mixture was refluxed overnight. The organic bases were isolated and purified by the procedure of Example 4. Thin layer chromatography of the product indicated that it was mainly desacetyl VLB. Desacetyl VLB was obtained in crystalline form from the residue using an ethanol-water solvent mixture.

Example 6.—Desacetyl VLB isobutyrate

Four hundred milligrams of desacetyl VLB were dissolved in an excess of isobutyric anhydride, and the solution was kept at ambient room temperature for about 72 hours. An excess of methanol was added to react with any unreacted anhydride and the resulting reaction mixture was kept at room temperature for another 3 hours. The volatile constituents were then removed by evaporation in vacuo. An excess of 14 N ammonium hydroxide was added to the resulting residue. The resulting free bases were extracted into methylene dichloride. The organic layer was separated and the solvents removed therefrom by evaporation in vacuo. The resulting residue was dissolved in 10 percent aqueous hydrochloric acid. The acidic aqueous layer was again made basic by the addition of an excess of 14 N ammonium hydroxide and the resulting free bases extracted into methylene dichloride. The organic layer was separated and the solvent removed by evaporation in vacuo. Thin layer chromatography on an aliquot of the resulting residue indicated a mixture of mono- and di-acylated material. The residue was, therefore, dissolved in 100 ml. of 20 percent aqueous alcohol to which 2 gm. of chromatographic grade silica-gel had been added. The mixture was stirred overnight at room temperature and then filtered. Evaporation of the filtrate in vacuo yielded a residue comprising pure desacetyl VLB isobutyrate as shown by thin layer chromatography. Infrared and nuclear magnetic resonance spectra of the product were in conformance with the expected structure.

Desacetyl LCR isobutyrate is prepared according to the above procedure by substituting desacetyl LCR for desacetyl VLB.

Example 7.—Desacetyl VLB formate

A mixture of 5 ml. of formic acid and 2 ml. of acetic anhydride was refluxed for about 2 hours, thus forming the mixed anhydride of formic and acetic acids. 500 mg. of desacetyl VLB were dissolved in the mixed anhydride and the resulting solution was stirred overnight at room temperature. The volatile constituents were removed by evaporation in vacuo. The residue was disolved in water and the resulting acidic solution was made basic by the addition of 14 N ammonium hydroxide. The organic bases, being insoluble in the alkaline layer, separated and were extracted into methylene dichloride. Thin layer chromatography of the material extracted into methylene dichloride indicated that a new acyl derivative of desacetyl VLB was present. Nuclear magnetic resonance and infrared spectra of the product indicated that the expected desacetyl VLB formate had been prepared.

Use of acetic anhydried in place of the mixed anhydride of formic and acetic acids in the above procedure yields VLB itself.

Example 8.—Desacetyl VLB propionate

Three hundred milligrams of desacetyl VLB were dissolved in about 5 ml. of propionic anhydride. The solution was stirred at room temperature for three days. Ten milligrams of methanol were added to react with the excess anhydried present and the volatile constituents were removed from the mixture by evaporation in vacuo. The resulting residue was dissolved in water. 14 N ammonium hydroxide was added to make the aqueous layer alkaline and the now-insoluble organic bases were extracted therefrom with methylene dichloride. The methylene dichloride extract was percolated through an alumina (grade III) column. Thin layer chromatography of the effluent on silica indicated that a new acyl derivative of the desacetyl VLB had been formed. Infrared and nuclear magnetic resonance spectral data indicated that the expected product, desacetyl VLB propionate, was the new acetylated product.

Desacetyl LCR propionate is also prepared by the above procedure by starting with desacetyl LCR in place of desacetyl VLB.

Example 9.—Desacetyl VLB phenylacetate

One-half milliliter of triethylamine and 100 mg. of phenylacetic acid were dissolved in dioxane at 0° C. One-tenth milliliter of ethyl chloroformate was added and the resulting mixture was stirred for one hour at 0° C. Three hundred milligrams of desacetyl VLB dissolved in 100 ml. of dioxane were added in dropwise fashion to the anhydride solution over a period of about 15 minutes. The reaction mixture was then stirred for two hours at 0° C. and at room temperature for about three days. Desacetyl VLB phenylacetate was isolated from the reaction mixture by the procedure of Example 6. Thin layer chromatography on an aliquot of the methylene dichloride extract indicated that a new acylated desacetyl VLB was present. Nuclear magnetic resonance and infrared spectral data indicated that the expected product, desacetyl VLB phenylacetate, was the new acylated product.

Example 10.—Desacetyl VLB chloroacetate

Five and twenty-six hundredths grams of desacetyl VLB sulfate were dissolved in water and an excess of 14 N ammonium hydroxide was added to the resulting solution. Desacetyl VLB free base separated and was extracted into methylene dichloride. The methylene dichloride solution was separated and was dried by adding benzene thereto and removing the water-benzene azeotrope in vacuo. Two and six-tenths grams of chloroacetic anhydride were added to the dried methylene dichloride solution. The reaction mixture was allowed to remain at room temperature overnight and was then refluxed for about 2.5 hours. An excess of methanol was added to the reaction mixture in order to destroy any excess of chloroacetic anhydride present. The volatile constituent was removed by evaporation in vacuo; the residue was dissolved in water; and the solution was made basic with 14 N ammonium hydroxide. The organic bases which separated were extracted into methylene dichloride. Ether was added. Four and one-half grams of a mixture of the mono and dichloroacetates of desacetyl VLB were obtained. Silica-gel hydrolysis, by the procedure set forth in Example 6, yielded desacetyl VLB chloroacetate, as shown by a nuclear magnetic resonance spectrum of the product.

Desacetyl LCR chloroacetate is prepared by the procedure described above, starting with desacetyl LCR.

Example 11.—Alternate preparation of desacetyl VLB phenylacetate

Three hundred fifty milligrams of desacetyl VLB sulfate were dissolved with heating and stirring in 75 ml. of acetonitrile. Six hundred milligrams of phenylacetic anhydride were added and the resulting mixture was heated at about 60° C. for fourteen hours. The solvents were removed by evaporation in vacuo and excess methanol was added to react with the excess phenylacetic anhydride. The volatile constituents were again removed by evaporation in vacuo, leaving a syrupy residue. The residue was dissolved in water; the aqueous solution was made alkaline; and desacetyl VLB phenylacetate, formed in the above reaction, separated and was extracted into methylene dichloride. The methylene dichloride extract was chromatographed over an alumina (grade II) column, using methylene dichloride as the developing solvent. The methylene dichloride was removed from the chromatographic effluent by evaporation in vacuo. The resulting residue was dissolved in methanol. Water and silica-gel were added to the solution, which was then refluxed for about four hours. The resulting solution was chromatographed over an alumina (grade II) column, and desacetyl VLB phenylacetate obtained from the effluent was crystallized from a methanol-water mixture. A nuclear magnetic resonance spectrum of the product indicated that desacetyl VLB phenylacetate had been formed.

Example 12.—Desacetyl VLB trichloroacetate

Following the procedure of Example 6, desacetyl VLB was reacted with trichloroacetic anhydride using an excess of the anhydride as a solvent. Desacetyl VLB trichloroacetate was isolated by the procedure of Example 6 and was purified by chromatography over alumina (grade II). The product was crystallized directly from the chromatographic effluent. A nuclear magnetic resonance spectrum of the crystalline product indicated that decasetyl VLB trichloroacetate had been formed.

Example 13.—Desacetyl VLB n-butyrate

Following the procedure of Example 6, desacetyl VLB was reacted with n-butyric anhydride using an excess of the anhydride as a solvent. Desacetyl VLB n-butyrate thus formed was isolated by the procedure of Example 6 and purified by chromatography. Purified desacetyl VLB n-butyrate thus obtained was crystallized from an ether-methylene dichloride solvent mixture.

The product thus obtained was dissolved in a mixture of methanol and water. One percent sulfuric acid was added to pH 2, thus forming desacetyl VLB n-butyrate sulfate, which was separated and then crystallized from a mixture of ethanol and isopropanol.

Example 14.—Alternate preparation of desacetyl VLB isobutyrate

The mixed anhydride of isobutyric and trifluoroacetic acids was prepared by reacting 1 ml. of isobutyric acid and 2 ml. of trifluoroacetic anhydride in acetonitrile solution at room temperature. The anhydride solution was stirred for about 30 minutes. Next, 300 mg. of desacetyl VLB dissolved in 50 ml. of acetonitrile were added. The resulting reaction mixture was stirred for about three days at room temperature. Desacetyl VLB isobutyrate was isolated by the procedure of Example 6 and was purified by chromatography over an alumina (grade II) column. Desacetyl VLB isobutyrate was crystallized directly from the effluent. A nuclear magnetic resonance spectrum of the crystalline material indicated that a single isobutyric ester group on a secondary carbon atom was present in the molecule.

Desacetyl VLB isobutyrate thus prepared was converted to the corresponding sulfate salt by the method of Example 13.

Example 15.—Desacetyl VLB benzoate

One and five-tenths grams of benzoic anhydride were added to a mixture of 1.35 mg. of desacetyl VLB sulfate in 50 ml. of acetonitrile. The reaction mixture was heated to refluxing temperature for about 2 hours and was then allowed to remain at room temperature for about three days. The volatile constituents were removed from the reaction mixture by evaporation in vacuo. The resulting residue comprising desacetyl VLB benzoate sulfate was washed with ether to remove any excess benzoic anhydride. Recrystallization of the residue from ethanol yielded a crystalline product which was shown by thin layer chromatography to be a mixture of desacetyl VLB and desacetyl VLB benzoate.

The above crystalline product was purified by a gradient pH extraction process which was carried out as follows: a citric acid solution containing 2.1 g. of citric acid and 100 ml. of water was prepared. The mixture of desacetyl VLB and desacetyl VLB benzoate was dissolved in 50 ml. of this citric acid solution and the resulting solution was extracted with benzene at pH=3.1. The pH was adjusted to about 3.6 and the extraction repeated. The pH of the solution was then increased by increments of about 0.5 pH unit by the addition of ammonium hydroxide up to pH 7.5. A benzene extraction was made at each pH. The benzene extract made from the solution at pH 3.9 was shown to contain a single substance by thin layer chromatography on silica, and was also shown by infrared and nuclear magnetic resonance spectra to contain the desired desacetyl VLB benzoate. The fractions from pH 3.1–pH 4.6 were combined. The solvents were removed by evaporation in vacuo and the resulting residue dissolved in ethanol and converted to the sulfate with 1 percent sulfuric acid as set forth in Example 13. Recrystallization of the sulfate from a methanol-ethanol mixture yielded pure desacetyl VLB benzoate sulfate.

Example 16.—Desacetyl VLB dichloroacetate

Following the procedure of Example 6, desacetyl VLB and an excess of dichloroacetic anhydride were reacted in methylene dichloride solution. Desacetyl VLB dichloroacetate thus prepared was isolated by the procedure of Example 6. Thin layer chromatography of the product derived from the methylene dichloride extract indicated that a new acylated desacetyl VLB was present and a nuclear magnetic resonance spectrum of the product indicated that desacetyl VLB dichloroacetate had been formed. The compounds was converted to the sulfate salt with 1 percent sulfuric acid at pH 2 as set forth in Example 13.

Example 17.—Desacetyl VLB cyanoacetate

Following the procedure of Example 7, desacetyl VLB was reacted with the mixed anhydride of cyanoacetic and trifluoroacetic acids. Desacetyl VLB cyanoacetate thus formed was isolated by the procedure of Example 6 and was purified by chromatography. The compound was crystallized from ether and then converted to the corresponding sulfate salt, which was crystallized from methanol. A nuclear magnetic resonance spectrum of the product confirmed the fact that desacetyl VLB cyanoacetate had been formed by the above procedure.

Example 18.—Desacetyl LCR

Four hundred milligrams of LCR were dissolved in about 50 ml. of methanol saturated with anhydrous hydrogen chloride. The mixture was maintained overnight at room temperature and was then evaporated to dryness in vacuo. The resulting residue was dissolved in water and the water layer made basic with 12 N ammonium aqueous hydroxide. The basic solution was extracted with methylene chloride; the methylene chloride layer was separated; and the methylene chloride removed therefrom by evaporation in vacuo. Thin layer chromatography of an aliquot of the residue demonstrated the presence of a single material, desacetyl desformyl LCR. The residue was taken up in 5 ml. of a solution containing 98 percent formic acid and acetic anhydride in a 1.1:1.0 molar ratio. (This mixture had been prepared two days earlier and had been kept at room temperature during that period.) The resulting solution was maintained at room temperature overnight. An excess of methanol was added and the resulting solution was kept at room temperature for two hours. An excess of an ice-water mixture was then added followed by an excess of 12 N aqueous ammonium hydroxide. The resulting basic layer was extracted with methylene dichloride; the methylene dichloride extract was separated; and the methylene dichloride removed therefrom by evaporation in vacuo. The resulting residue, which contained both desacetyl LCR and a formate ester of desacetyl LCR was hydrolyzed overnight in refluxing methanol in the presence of 0.1 g. of silica-gel. This procedure served to hydrolyze a substantial quantity of the formate ester compound to desacetyl LCR. The residue obtained from the hydrolysis procedure, after separation of the silica-gel, was chromatographed over alumina. Fractions containing predominantly desacetyl LCR according to thin layer chromatography were combined and submitted to a gradient pH extraction procedure following the method set forth in the copending application of Svoboda et al., Ser. No. 147,911, filed Oct. 26, 1961. Fractions extracted in this procedure at pH 5.5 and 6.5 contained only a single compound according to thin layer chromatography and were combined. Infrared and nuclear magnetic resonance spectra of the compound in the combined fractions were consistent with the desacetyl LCR structure assigned to them.

If the formylation of desformyl desacetyl LCR as described above is continued for only one-half hour instead of overnight, N-formylation will be the chief reaction taking place and substantially pure desacetyl LCR will be obtained.

Example 19.—Preparation of salts

Other salts including salts with inorganic anions such as chloride, bromide, phosphate, nitrate, and the like as well as salts with organic anions such as acetate, chloroacetate, trichloroacetate, benzoate, and the like are prepared by a procedure analogous to that set forth in Example 13 above for the preparation of sulfate salts by employing the appropriate acid in a suitable dilution in place of the 1 percent aqueous sulfuric acid of that example.

I claim:
1. A compound represented by the following formula:

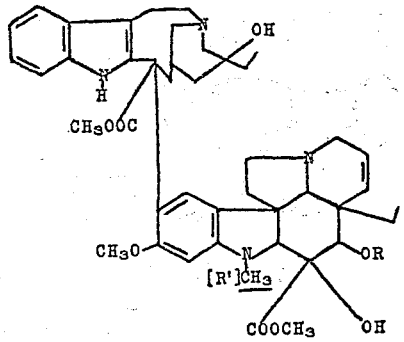

wherein R is a member of the group consisting of phenylacetyl, benzoyl, chloroacetyl, dichloroacetyl and cyanoacetyl.
2. A pharmaceutically acceptable acid addition salt of a compound according to claim 1.
3. Desacetylvincaleukoblastine chloroacetate.
4. Desacetylvincaleukoblastine benzoate.
5. Desacetylvincaleukoblastine cyanoacetate.
6. Desacetylvincaleukoblastine dichloroacetate.
7. Desacetylvincaleukoblastine phenylacetate.
8. A sulfate salt of a compound according to claim 1.
9. A compound represented by the following formula:

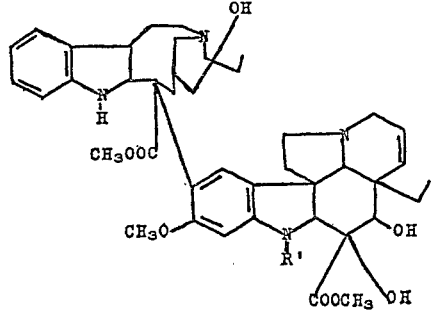

wherein R' is methyl or formyl.
10. A process which comprises selectively hydrolyzing a compound represented by the following formula:

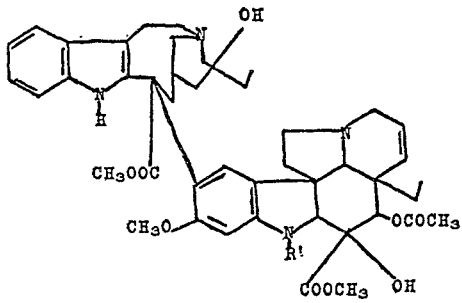

wherein R' is methyl or formyl,
to yield a compound represented by the following formula:

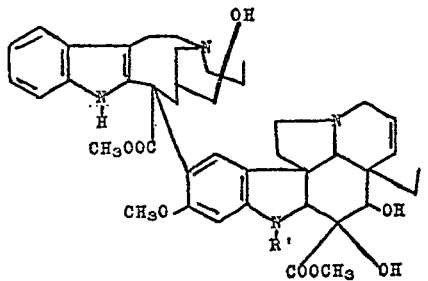

wherein R' has the same meaning as hereinabove; treating said hydrolyzed compound with an acylating agent to yield a mixture of mono- and di-acylated products and then treating said mixture with silica-gel in a solvent for said mixture to produce a compound represented by the following formula:

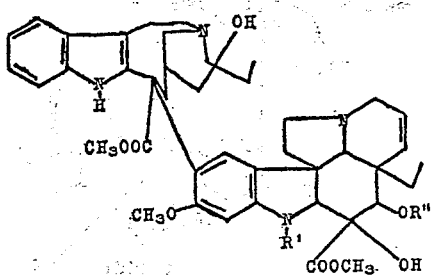

wherein R" is a member of the group consisting of $C_1$–$C_5$ alkyl-CO—, H—CO—, phenyl-substituted $C_1$–$C_5$ alkyl-CO—, phenyl-CO, halo-substituted $C_1$–$C_5$ alkyl-CO, and cyano-substituted $C_1$–$C_5$ alkyl-CO—; and, R' has the same meaning as hereinabove.

References Cited

UNITED STATES PATENTS

| | | | |
|---|---|---|---|
| 3,097,137 | 7/1963 | Beer et al. | |
| 3,169,968 | 2/1965 | Bartlett et al. | 260—236 X |
| 3,225,053 | 12/1965 | Gorman | 260—236 X |

NICHOLAS S. RIZZO, *Primary Examiner.*

D. DAUS, *Assistant Examiner.*